US005511433A

United States Patent [19]

Sabloewski et al.

[11] Patent Number: 5,511,433

[45] Date of Patent: Apr. 30, 1996

[54] PIPETTE DEVICE

[75] Inventors: Horst Sabloewski; Ingo Cordes, both of Hamburg; Jochen Beese, Norderstedt; Klaus Schürbrock, Hamburg, all of Germany

[73] Assignee: Eppendorf-Netherler-Hinz GmbH, Hamburg, Germany

[21] Appl. No.: 991,475

[22] Filed: Dec. 16, 1992

Related U.S. Application Data

[63] Continuation of Ser. No. 694,234, May 1, 1991, abandoned.

[30] Foreign Application Priority Data

May 4, 1990 [DE] Germany .......................... 40 14 333.3

[51] Int. Cl.[6] ................................ G01N 1/14; B01L 3/02

[52] U.S. Cl. ...................................... 73/864.14; 73/864.16

[58] Field of Search ............................ 73/864.16, 864.18, 73/864.14

[56] References Cited

U.S. PATENT DOCUMENTS

| | | | |
|---|---|---|---|
| 3,506,164 | 4/1970 | Weichelbaum . | |
| 3,646,817 | 3/1972 | Hinchman et al. | 73/864.17 |
| 3,732,735 | 5/1973 | Cohen | 73/864.16 |
| 3,853,012 | 2/1974 | Scordato et al. | 73/864.16 |
| 3,901,413 | 8/1975 | Harris, Sr. | 73/864.16 |
| 3,918,308 | 11/1975 | Reed | 73/864.14 |
| 4,037,464 | 7/1977 | Wenander | 73/61.4 |
| 4,041,764 | 8/1977 | Sabloewski et al. | 73/864.14 |
| 4,133,211 | 1/1979 | Sarstedt | 73/864.17 |
| 4,141,250 | 2/1979 | D'Autry | 73/864.17 |
| 4,399,712 | 8/1983 | Oshikubo et al. | 73/864.16 |
| 4,616,514 | 11/1986 | Magnussen, Jr. et al. | 73/864.14 |
| 4,625,572 | 12/1986 | Yamashita | 73/864.16 |
| 5,012,682 | 5/1991 | Sabloewski et al. | 73/864.18 |

FOREIGN PATENT DOCUMENTS

| | | | |
|---|---|---|---|
| 88117553 | 1/1976 | European Pat. Off. . | |
| 2330456 | 11/1978 | France . | |
| 858148 | 12/1952 | Germany | 73/864.16 |
| 1598165 | 2/1972 | Germany . | |
| 1952774 | 11/1972 | Germany . | |
| 2525713 | 1/1976 | Germany . | |
| 2549477 | 5/1977 | Germany . | |
| 2720669 | 12/1977 | Germany . | |
| 2651333 | 5/1978 | Germany . | |
| 542547 | 1/1974 | U.S.S.R. | 73/864.18 |

*Primary Examiner*—Tom Noland
*Attorney, Agent, or Firm*—Kinney & Lange

[57] ABSTRACT

A pipette device, comprising a housing, an actuating element projecting from the upper end of this housing, a cylinder, a hollow piston moveable in this cylinder for displacing an air volume, a rod connecting this piston to this actuating element which is depressed against spring force to displace this piston, and an adapter cone for receiving replaceable pipette tips communicating with this cylinder. According to the invention the hollow piston comprises an outer tubular shell and an inner support which is preferably made of plastic material and to which the actuating element is connected by a coupling. The invention particularly refers to providing a variety of shells made of different materials which can be easily replaced.

14 Claims, 4 Drawing Sheets

PIPETTE DEVICE

This is a continuation of application Ser. No. 07/694,234 filed on May 1, 1991, abandoned as of the date of this application.

The present invention refers to a pipette device, comprising a housing, an actuating element projecting from the upper end of said housing for depressing the actuating element against a spring force, further comprising a cylinder, a hollow piston moveable in said cylinder for displacing an air volume, said piston being connected to said actuating element by a rod, and comprising a support, an adapter cone for receiving replaceable pipette tips communicating with said cylinder, said hollow piston comprising an outer shell mounted on said support preferrably made of plastic material.

BACKGROUND OF THE INVENTION

For an understanding how a pipette device is assembled and operated, it is referred to German application 25 49 477 and European application 88 11 755 3.3–2113/0 364 621.

The German application referred to discloses an improvement of known pipette devices to facilitate the handling and to reduce the force which is necessary to operate the device. The piston of this pipette is solid and shaped as a rod which tightly enters a cylinder which opens towards an adapter cone on which a pipette tip is placed. The rod shaped piston is suited to take up very small volume, the piston diameter being in the range of 1 to 5 mm.

The European application improves the calibration of a pipette and discloses an embodiment in which the piston is connected to a piston rod through a connecting member which is shaped as a rod of a small cross section. The connecting member allows to make the rod and the piston of different materials.

Contrarily, the present invention refers to a pipette device comprising a piston of a cross section which is larger than the tubular passage to the adapter cone.

This structure facilitates handling varying pipetting volume in providing an individual cylinder chamber above the tubular passage to the adapter cone.

The piston is adjustably mounted in the cylinder to take up different pipetting volume. Accordingly, the piston stroke is adjusted by setting the piston initially to a predetermined position.

It is a drawback of the pipette device of this type that there is a play between the piston and the cylinder and that this space is filled with residual air. This is detrimental to the pipetting accuracy, in particular under the aspect that the liquids to be handled contain gases or the air drawn in has the same temperature. However, for pipetting a larger volume, an enlarged cylinder chamber is necessary.

A pipetting device of the type above referred to is shown by German specification 1 952 774. The piston of this pipette device comprises a projection and an annular seal cooperating with the cylinder wall. The projection is provided with a fluorocarbon sleeve which is cemented thereon or tightly pressed on. This is an expensive manufacturing step and relative changes in position of the sleeve and projection cannot be excluded over an extended time of use resulting in decreasing the pipetting accuracy. Furthermore, vibrations or impacts transferred from the actuating button are detrimental to the calibration of the pipetting volume. Apparently the piston cannot be guided in a tight and sealing engagement with the cylinder wall so that the sealing ring additionally Serves to make up for the piston play. However, the wear of the sealing ring is relatively high. Furthermore the material of the piston cannot be suited to different substances to be handled with the pipette which must be replaced as a whole when the wear of the piston becomes excessive.

It is an object of the present invention to provide an improved pipetting device which is easy to make, maintains a high degree of accuracy, provides an improved guiding and sealing to reduce the wear and is suited to handle a broad variety of substances without replacing the pipette device as a whole.

SUMMARY OF THE INVENTION

In a pipette device above referred to, the piston is hollow and comprises an outer shell mounted on a support. According to the invention the shell is tubular in shape and annular seals are provided on the support cooperating with the inner wall of the shell plugged on the support. Still further a disk shaped element is provided to cover a lower opening of the shell to maintain the shell in position on the support.

A hollow piston comprising a precision shell is a greatly improved embodiment as the outer piston wall may be greatly reduced, as a steel shell may be used for example which results in a very small wall thickness of the piston. This results in a further advantage as the thin-walled shell of a high heat conductivity in combination with the support may be designed such to obtain a high heat insulation between the handle portion of the pipette device and its tip. Still further, by providing a hollow piston, the piston sleeve or, respectively piston shell may be easily replaced to suit different substances to be handled.

The shell is maintained in position by the disk shaped element. In combination with the annular seals replacing the shell and assembling the piston is facilitated, the sealing rings further compensating for dimensions and tolerances and allowing the piston to adjust with respect to the cylinder wall.

According to a further embodiment the shell is made of a ceramic mass to handle liquids containing agressive gases, acids or other agressive liquid of high vapour pressure.

According to another embodiment a coupling is provided for removable mounting the rod to the support and wherein the coupling comprises a supporting surface for the upper end of the shell and wherein the support is removable mounted on the coupling and the diameter of the support is selected according to the wall thickness of the shell which results in an easy replacement of the piston. Any differences in diameter are compensated for by selecting sealing rings of varying thickness. Still further the structure according to the invention allows to replace the shell as well as the support.

According to a still further embodiment of the present invention the support, the actuating rod and the disk shaped element may be an integral structure.

The embodiment according to the invention further allows to provide a rather small play between the piston and the cylinder wherein the difference between the diameters of the cylinder and the piston is in a range of 0.4 mm. This advantage is substantial in order to avoid that gases and air of different temperatures are mixed which air and gas originates from the handle portion on the one hand and from the working tip on the other hand.

This is still further improved by providing a piston guide which is floatingly supported by pressing the sleeve by means of a spring and through a seal on an inner conical wall portion of the pipette housing. With the actuating rod mounted in the coupling by means of axial webs which are provided in peripheral distances facing the rod, replacing the piston is improved By providing at least one of the annular seals integrally mounted on the support which is made of a plastic material suitable for sealing it facilitates the guiding and assembling by saving parts i.e. individual seals.

BRIEF DESCRIPTION OF THE DRAWINGS

Other advantages and features of the invention will appear from the following description of one non-limiting embodiment with reference to the figures which show.

DESCRIPTION OF THE PREFERRED EMBODIMENT

Figure 1:
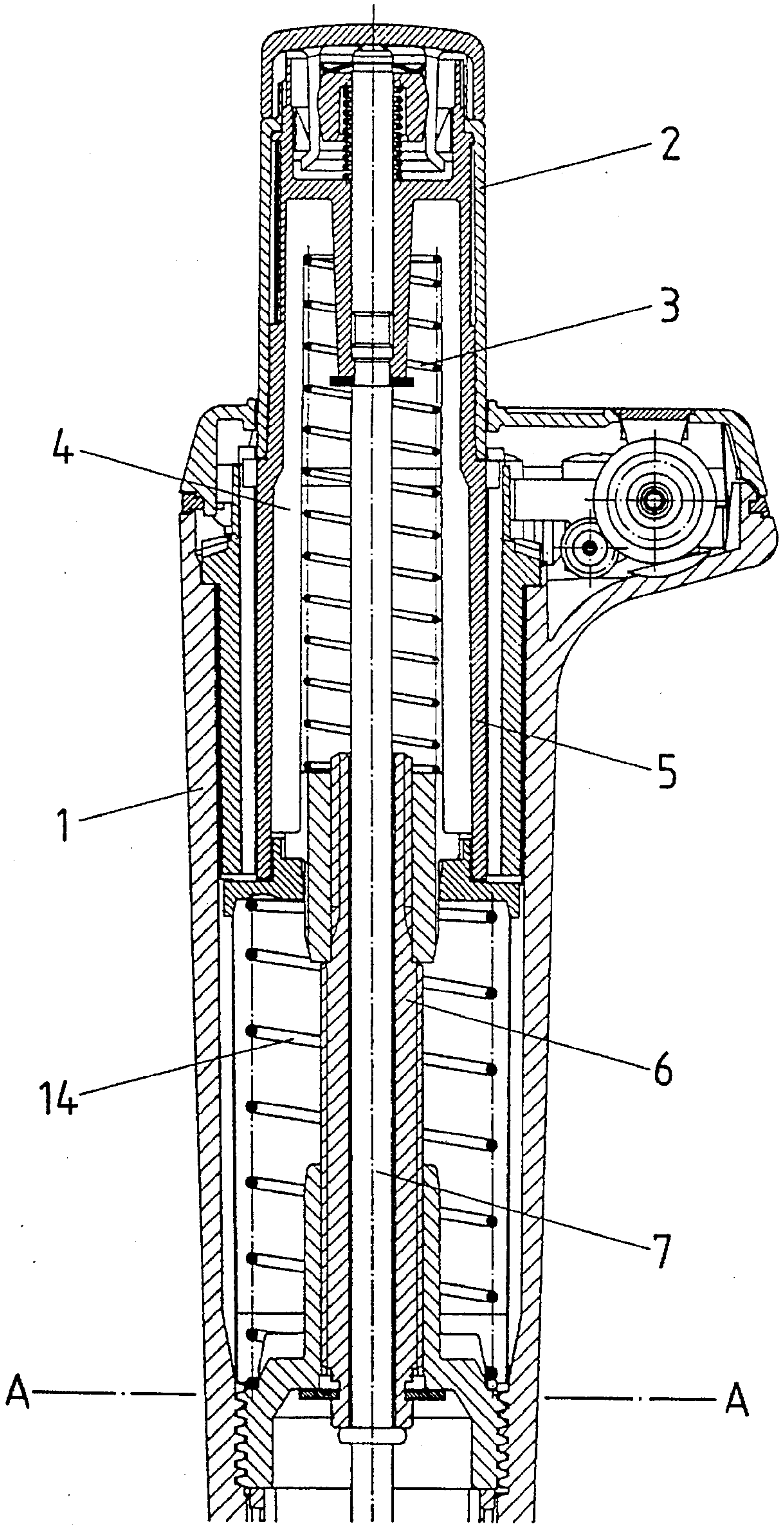
FIGS. 1 to 3 three sections of a pipette device illustrating a side section of the pipette device when placed one to the other lengthwise at A—A and B—B.
Figure 2:
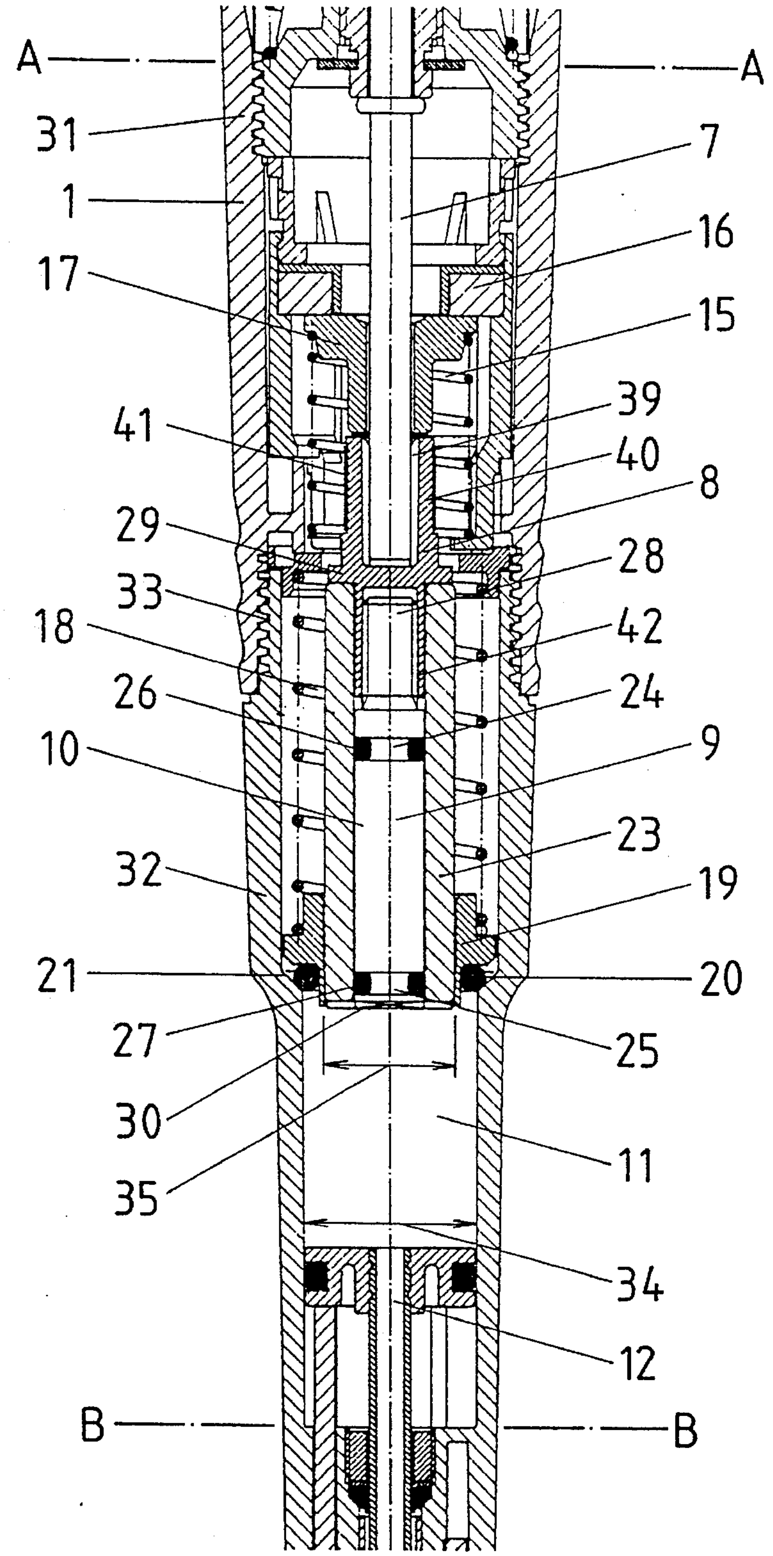
Figure 3:
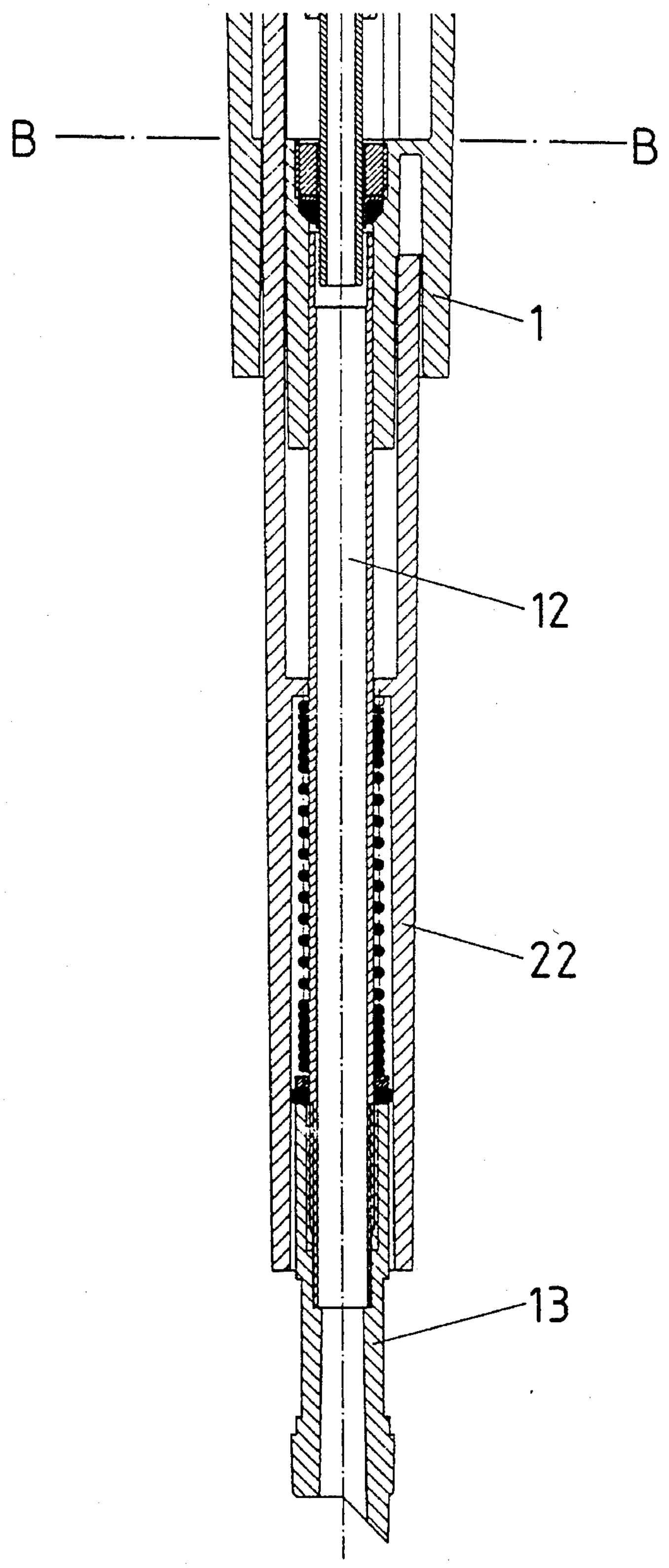

The pipette device shown in FIGS. 1 to 3 comprises a housing 1 which may be composed of a number of portions, but is numbered 1 throughout. At the upper end of the housing there is an actuating button 2 which is moveable against a spring 3 as well as rotatable to vary the volume of the pipette device by setting and driving means 4. By rotating the button a spindle 6 is rotated through sleeves 5 in order to forwardly displace a rod 7. The lower end of the rod carries a connecting piece 8 including a support 9 for a piston 10.

This piston may be displaced in a cylinder 11 from which a tube-like connection 12 leads to a connecting cone 13.

The spring 14 shown in FIG. 1 serves to return the actuating button. The spring 15 serves to return the piston to its normal position and, in particular, to maintain the connection between a holding means, for example a magnet 16 and a moveable counter magnet element 17.

The spring 18 serves to urge a lower sleeve 19 for the piston 10 to an internal conical face 21 of the housing 1 through a resilient sealing ring 20. The spring 18 may be replaced by a sleeve.

FIG. 3 shows a structure which is not the subject of the invention providing an axially moveable sleeve 22 which is suited to release containers pushed on.

According to the invention the piston 10 is a hollow piston. The piston comprises an outer tube-like shell 23 and an inner support 9 made of a heat insulating plastic material including a pair of annular grooves 24, 25 for accommodating annular seals 26, 27. Depending on what material is used the seals may be rubber seals or resistant elastic plastic seals. The seals guide the shell 23 which has a sliding seat on the support 9 according to a particular embodiment of the invention.

According to the embodiment shown the support is connected to the connecting piece 8 by means of a projection 28 screwed on or plugged in. The connecting piece 8 is particularly made of a heat insulating material. It may be resilient and carries an outward flange 29 for supporting the upper edge of the tubular shell 23.

The functional features of the connecting piece reside in the material and further in the easy suspension and assembly i.e. for replacing the support 9 of the piston 10. For this the connecting piece comprises an upwardly directed sleeve 40 including inwardly facing axial webs 39 between peripheral slots, the webs 39 fitting to the rod and defining a matching connection. The connection is improved by an outer, in particular metallic clamp 41 which may be releasably mounted when changing the plugging connection between the projection 28 and a lower suspending portion 42 of the connecting piece, and, is not sufficient for a safe connection on the one hand, but for a releasable connection on the other hand.

The lower edge of the tubular shell is held on the support 9 by a preferrably disk shaped element 30 which is secured to the support 9.

Figure 4:
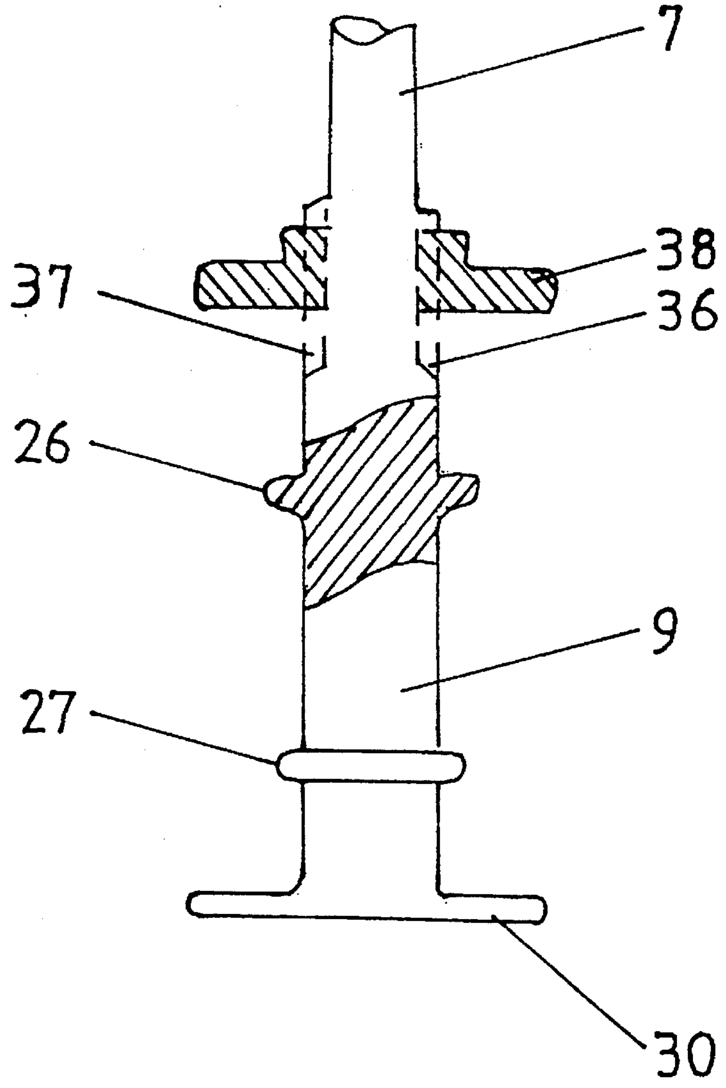
FIG. 4 a part view of the pipette device illustrating a special element in an enlarged scale showing a particular embodiment.

FIG. 4 shows a one-piece embodiment of the support 9 and rod 7.

The thickness of the shell 23 may be selected such that it can be made of ceramic material. The shell may be replaced by removing the coupling 8 from the support 9. Access is provided by unscrewing a threading connection 33 between an upper handle portion 31 and a lower pipette portion 32. While FIG. 2 shows a relatively thick walled shell, it may be replaced by a metal casing of a very thin thickness.

The difference between the inner diameter 34 of the cylinder 11 and the outer diameter 35 of the piston 10 can be selected very small, preferrably in the range of 0.4 mm.

FIG. 4 shows a disk shaped element 30 integral with the support 9 projecting from the rod 7. The support 9 carries the sealing rings 26 and 27. For mounting the shell not shown in FIG. 4 the upper support must be removed. For example a flange 38 may be threaded on an extension 36 provided with a thread 37.

In this embodiment the shell has to be replaced from above.

FIG. 4 shows a further particularity for the seal 26 which is integrally formed on the support 9. The same applies for the seal 27. The integral element shown in FIG. 4 is made of a plastic material suitable for sealing and having sufficient strength.

We claim:

1. A pipette device, comprising a housing, an actuating element projecting from an upper end of said housing, a cylinder provided in said housing, a piston movable in said cylinder for displacing an air volume in said cylinder, a rod connecting said piston to said actuating element which is adapted to be manually depressed against a spring bias to move said piston in said cylinder, and an adapter cone attached to said housing and adapted to receive a replaceable pipette tip communicating with said cylinder, said piston comprising an outer tube-like shell and an inner support carrying said outer shell and connected to said actuating element by said rod, said outer shell being comprised of metal and said inner support being formed of a heat insulating material comprised of plastic.

2. The pipette device of claim 1 wherein outer shells of the piston made of different materials and having identical wall thickness are provided for replacement.

3. The pipette device of claim 1 wherein said tube-like shell has a sliding fit on said support, annular seals being provided on said support for engaging an inner wall of said tube-like shell.

4. The pipette device of claim 1 wherein said outer tube-like shell has a lower opening closed by a disk shaped element so that said tube-like shell is held on said support.

5. The pipette device of claim 4 wherein the support, the rod and the disk shaped element are comprised of a one-piece member.

6. The pipette device of claim 5 wherein said one-piece member comprises a threaded extension with a flange for threadably mounting said shell to said support.

7. The pipette device of claim 5 wherein the one-piece member comprises at least one annular seal about said support member and integrally formed therewith for engaging an inner wall of said tube-like shell.

8. The pipette device of claim 1 wherein the outer tube-like shell of the piston is made of steel.

9. A pipette device, comprising a housing, an actuating element protecting from the upper end of said housing, a cylinder provided in said housing, a piston movable in said cylinder for displacing an air volume in said cylinder, a rod connecting said piston to said actuating element, said actuating element being adapted to be manually depressed against a spring bias to move said piston in said cylinder, and an adapter cone attached to said housing and adapted to receive a replaceable pipette tip communicating with said cylinder, said piston comprising an outer tube-like shell fixedly connected to an inner support to move as a unit for operation, said inner support being formed of a heat insulating material and a coupling for removably mounting said rod to said support the coupling comprising a supporting surface for the upper end of said shell.

10. The pipette device of claim 9 wherein said support is removeably mounted on said coupling.

11. The pipette device of claim 9 wherein said coupling is provided between the rod and said support.

12. The pipette device of claim 11 wherein the rod is mounted in said coupling by means of axial webs which are provided in peripheral distances facing said rod.

13. A pipette device, comprising a housing, an actuating element projecting from the upper end of said housing, a cylinder provided in said housing, a piston movable in said cylinder for displacing an air volume in said cylinder, a rod connecting said piston to said actuating element, said actuating element being adapted to be manually depressed against a spring bias to move said piston in said cylinder, and an adapter cone attached to said housing and adapted to receive a replaceable pipette tip communicating with said cylinder, said piston comprising an outer tube-like shell fixedly connected to an inner support to move as a unit for operation, said inner support being formed of a heat insulating material and including a guide sleeve slidingly receiving said piston, which guide sleeve is resiliently urged into engagement with an annular seal supported on an inner conical wall portion of the housing.

14. A pipette device, comprising a housing, an actuating element projecting from an upper end of said housing, a cylinder provided in said housing, a piston movable in said cylinder for displacing an air volume in said cylinder, a rod connecting said piston to said actuating element which is adapted to be manually depressed against a spring bias to move said piston in said cylinder, and an adapter cone attached to said housing and adapted to receive a replaceable pipette tip communicating with said cylinder, said piston comprising an outer tube-like shell and an inner support carrying said outer shell and connected to said actuating element by said rod, said outer shell being comprised of ceramic material and said inner support being formed of a heat insulating material comprised of plastic.

* * * * *